US008635496B2

(12) United States Patent
Hidaka et al.

(10) Patent No.: US 8,635,496 B2
(45) Date of Patent: Jan. 21, 2014

(54) TROUBLE ANALYSIS APPARATUS

(75) Inventors: Youichi Hidaka, Tokyo (JP); Takashi Yoshikawa, Tokyo (JP); Junichi Higuchi, Tokyo (JP)

(73) Assignee: NEC Corporation, Tokyo (JP)

( * ) Notice: Subject to any disclaimer, the term of this patent is extended or adjusted under 35 U.S.C. 154(b) by 344 days.

(21) Appl. No.: 13/057,365

(22) PCT Filed: Aug. 4, 2009

(86) PCT No.: PCT/JP2009/003715
§ 371 (c)(1),
(2), (4) Date: Feb. 3, 2011

(87) PCT Pub. No.: WO2010/016239
PCT Pub. Date: Feb. 11, 2010

(65) Prior Publication Data
US 2011/0145647 A1 Jun. 16, 2011

(30) Foreign Application Priority Data
Aug. 4, 2008 (JP) ................. P2008-201272

(51) Int. Cl.
G06F 11/00 (2006.01)
(52) U.S. Cl.
USPC .......................................... 714/26
(58) Field of Classification Search
USPC .......................................... 714/26
See application file for complete search history.

(56) References Cited

U.S. PATENT DOCUMENTS 7,529,974 B2 * 5/2009 Thibaux et al. .............. 714/26
7,631,222 B2 * 12/2009 Hasan et al. ................. 714/26
7,664,986 B2 * 2/2010 Angamuthu et al. ......... 714/27
7,860,682 B2 * 12/2010 Hamilton et al. ............ 702/183
8,234,522 B2 * 7/2012 Baker et al. ................. 714/26
2005/0210331 A1 * 9/2005 Connelly et al. ............ 714/26
2008/0059839 A1 * 3/2008 Hamilton et al. ............ 714/26
2012/0079324 A1 * 3/2012 Aphale ........................ 714/26

FOREIGN PATENT DOCUMENTS

| JP | 11-259331 A | 9/1999 |
| JP | 11-338804 A | 12/1999 |
| JP | 2000069003 A | 3/2000 |
| JP | 2001256032 A | 9/2001 |

(Continued)

OTHER PUBLICATIONS

International Search Report for PCT/JP2009/003715 mailed Nover Nov. 2, 2009.

*Primary Examiner* — Amine Riad

(57) ABSTRACT

A trouble analysis apparatus is provided which includes: a system topology storing portion; an error detection information receiving portion which collects error detection information; and a trouble source determination portion which, based on both the error detection information collected by the error detection information receiving portion and system topology information stored in the system topology information storing portion, determines a trouble source functional element that is presumed as a functional element which is a source of a system trouble. Links included in the system topology information have information indicating spreading directions of error operations between the functional elements when trouble occurs. When the trouble source detection portion receives the error detection information with regard to multiple error functional elements, the trouble source determination portion sequentially selects one of the multiple error functional elements. The trouble source detection portion determines whether or not directions from the selected error functional element to other error functional elements conform to the spreading directions included in the system topology information. The trouble source determination portion determines the selected error functional element as the trouble source functional element when the spreading directions are conformable.

7 Claims, 15 Drawing Sheets

(56) References Cited

FOREIGN PATENT DOCUMENTS

| JP | 2005258501 A | 9/2005 |
|---|---|---|
| JP | 2005538459 A | 12/2005 |
| JP | 2006133983 A | 5/2006 |
| JP | 2008066668 A | 3/2008 |

* cited by examiner

FIG. 2

BASIC TOPOLOGY INFORMATION

| TABLE NO. | EACH LAYER OF EACH APPARATUS | TOPOLOGY INFORMATION |
|---|---|---|
| 1 | COMPUTER HARDWARE | MAIN MEMORY V104◇CPU V103◇NETWORK CARD V101<br>CPU V103◇HDD V102<br>V104◇OPERATING SYSTEM MEMORY MANAGEMENT<br>V103◇OPERATING SYSTEM<br>V101◇NETWORK I/F<br>V102◇OPERATING SYSTEM |
| 2 | SWITCH HARDWARE | MEMORY V306◇CPU V305◇SWITCH FABRIC V304◇NETWORK I/F 301<br>SWITCH FABRIC V304◇NETWORK I/F 302<br>SWITCH FABRIC V304◇NETWORK I/F 303 |
| ... | ... | ... |
| 9 | CABLE | ◇CABLE◇ |
| 10 | CLIENT APPLICATION | APPLICATION 221 |

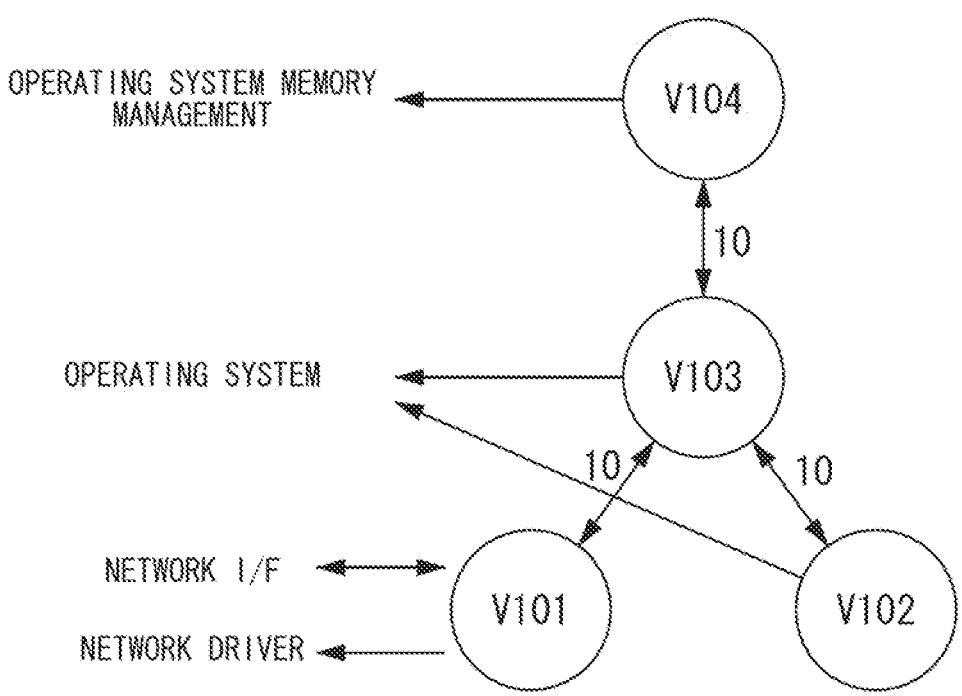

SYSTEM TOPOLOGY INFORMATION

TROUBLE FUNCTIONAL
ELEMENT EXTRACTION

TROUBLE TOPOLOGY INFORMATION

ASSUMING Vc AS TROUBLE
SOURCE FUNCTIONAL ELEMENT

ASSUMING Vd AS TROUBLE
SOURCE FUNCTIONAL ELEMENT

ASSUMING Vf AS TROUBLE
SOURCE FUNCTIONAL ELEMENT

ASSUMING Ve AS TROUBLE
SOURCE FUNCTIONAL ELEMENT

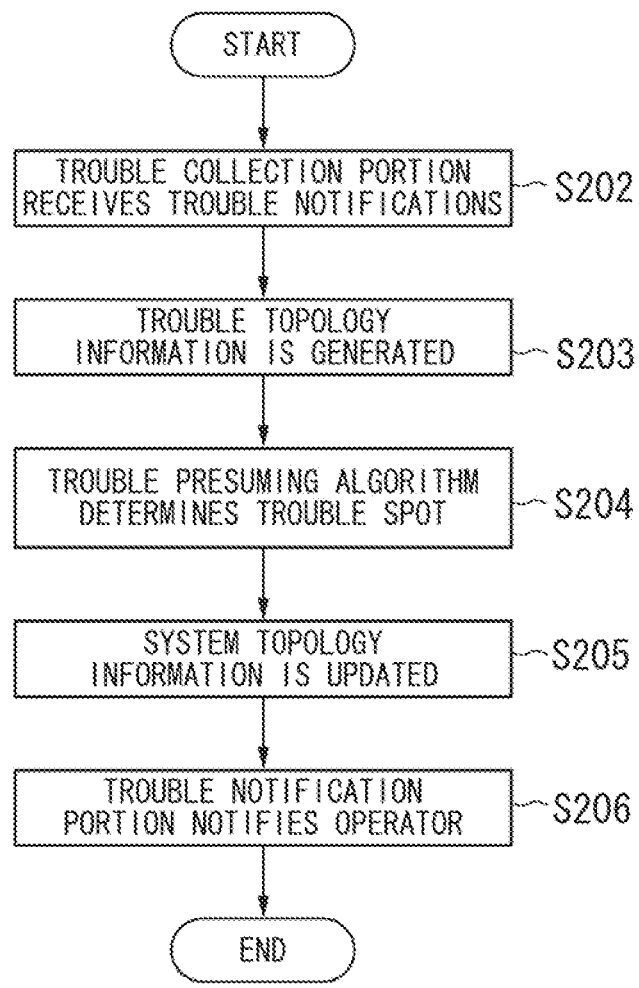

FIG. 12

| TABLE NO. | TROUBLE NOTIFICATION SOURCE 1 | TROUBLE NOTIFICATION SOURCE 2 | TROUBLE NOTIFICATION SOURCE 3 | ... | TROUBLE NOTIFICATION SOURCE N | PRESUMABLE SPECIFIC TROUBLE SPOT 1 | PRESUMABLE SPECIFIC TROUBLE SPOT 2 |
|---|---|---|---|---|---|---|---|
| 1 | NETWORK INTERFACE 301 | NETWORK CARD 101 | NONE | ... | NONE | CABLE 2 | SWITCH HARDWARE 300 |
| 2 | SERVER APPLICATION 120 | NETWORK DRIVER 111 | NONE | ... | NONE | NETWORK CARD 101 | CPU103 |
| ... | ... | ... | ... | ... | ... | ... | ... |
| 9 | ROUTING PROTOCOL 321 | SWITCH DRIVER 311 | NONE | ... | ADDRESS INFORMATION | CPU305 | SWITCH FABRIC 304 |
| 10 | CLIENT APPLICATION 220 | NONE | NONE | ... | NONE | SWITCH HARDWARE 300 | SERVER APPLICATION 120 |

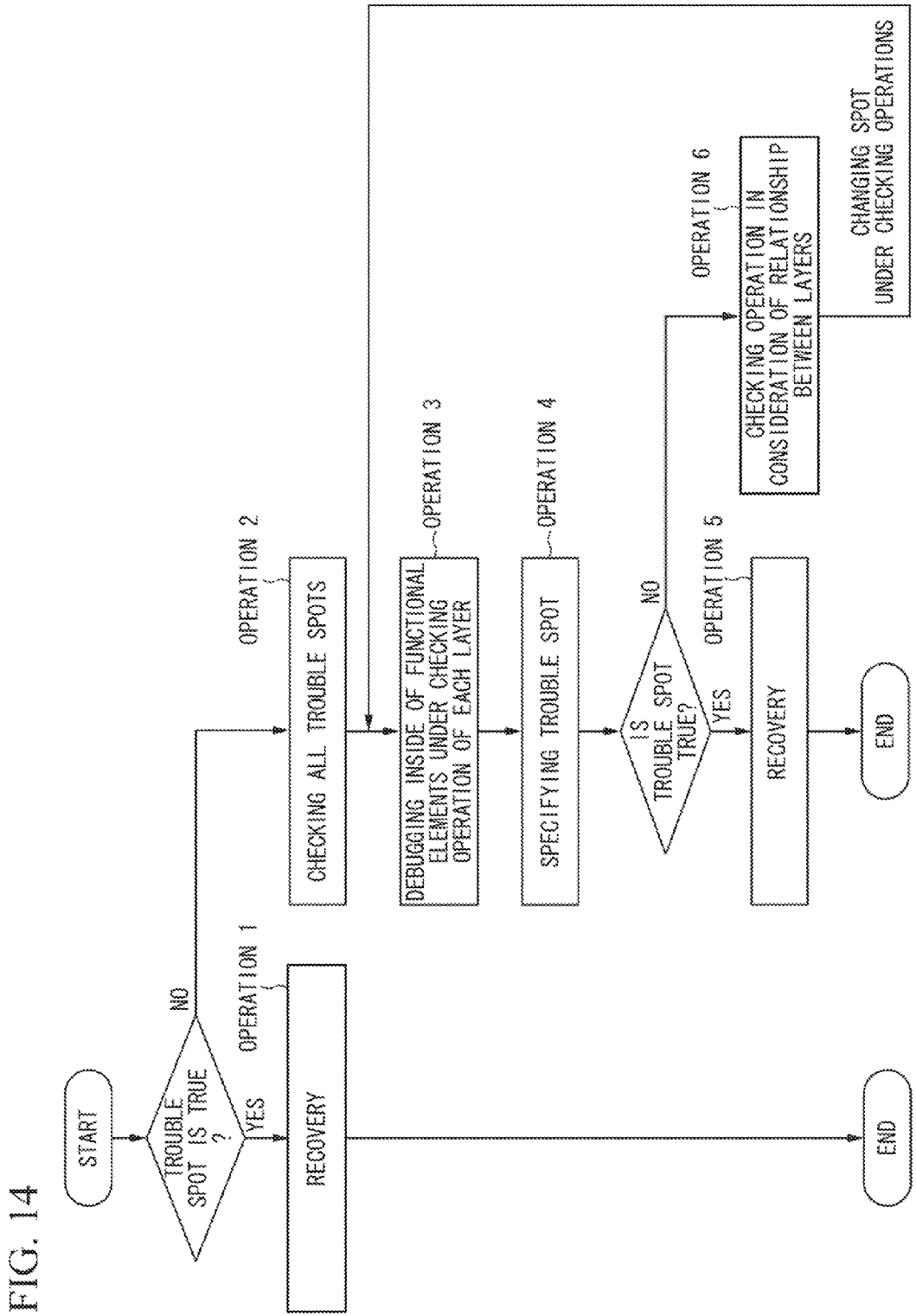

TROUBLE ANALYSIS APPARATUS

The present application is the National Phase of PCT/JP2009/003715, filed Aug. 4, 2009, which claims priority based on Japanese Patent Application No. 2008-201272, filed Aug. 4, 2008, the content of which is incorporated herein by reference.

BACKGROUND OF THE INVENTION

1. Technical Field

The present invention relates to a trouble analysis apparatus of a computer system. Particularly, the present invention relates to a trouble analysis apparatus for determining a cause of a trouble when the computer system has trouble.

Priority is claimed on Japanese Patent Application No. 2008-201272, filed Aug. 4, 2010, the content of which is incorporated herein by reference.

2. Background Art

Today, many computer systems are constituted from hardware and software. In addition, such hardware and software are respectively constituted from elements (hereinafter, "functional elements") that respectively implement functions. In other words, each apparatus including software constitutes multiple layers from hardware to software. The functional elements belonging to each layer cooperate each other and implement functions as one apparatus (an apparatus with multiple layers including software is called a "multilayer apparatus"). In addition, a system constituted from multiple multilayer apparatuses (hereinafter, a "multilayer system") is generally used.

FIG. 3 is a drawing for explaining a multilayer system 1 which is an example of the multilayer system and which is a type of a client-server system. The multilayer 1 is constituted from a server 10, a client 2 and a switch 30 as shown in FIG. 10. The server 10, the client 20 and the switch 30 are examples of multilayer apparatuses.

The server 10 is constituted from a computer hardware 100, an operating system 110 and a server application 120. In other words, the server 10 is constituted from three layers including a hardware layer implemented by the computer hardware 100, an operation layer implemented by the operating system 110 and an application layer implemented by the server application 120.

The client 20 is constituted from a computer hardware 200, an operating system 210 and a client application 220. In other words, the client 20 is constituted from three layers including a hardware layer implemented by the computer hardware 200, an operation layer implemented by the operating system 210 and an application layer implemented by the client application 220.

The switch 30 is constituted from a switch hardware 300, an operating system 310 and a switch application 320. In other words, the switch 30 is constituted from three layers including a hardware layer implemented by the switch hardware 300, an operation layer implemented by the operating system 310 and an application layer implemented by the switch application 320.

The computer hardware 100 of the server 10 is constituted from a network card 101, a HDD 102, a CPU 103, a main memory 104 and a trouble monitoring portion 109. The network card 101, the HDD 102, the CPU 103 and the main memory 104 are functional elements that belong to the computer hardware 100. It should be noted that the trouble monitoring portion 109 monitors the network card 101, the HDD 102, the CPU 103 and the main memory 104, and when the trouble monitoring portion 109 detects trouble in such functional elements, a trouble notification (error notification information) is transmitted to a trouble analysis apparatus 40 (FIG. 11, explained below).

The operating system 110 of the server 10 is constituted from a network driver 111, a HDD 112, a network protocol 113, a memory management portion 114 and a trouble monitoring portion 119. The network driver 111, the HDD 112, the network protocol 113 and the memory management portion 114 are functional elements belonging to the operating system 110 of the server 10. It should be noted that the trouble monitoring portion 119 monitors the network driver 111, the HDD 112, the network protocol 113 and the memory management portion 114 and transmits a trouble notification to the trouble analysis apparatus 40 when detecting trouble regarding such functional elements. Further, the network protocol 113 is a processing portion for processing, for example, TCP/IP operations, or is a management portion (management program) of the processing portion. A network protocol 213 (shown below) is the same as the network protocol 113.

The server application 120 of the server 10 is constituted from an application processing portion 120 and a trouble monitoring portion 129. The application processing portion 121 is a functional element belonging to the server application 120 of the server 10. It should be noted that the trouble monitoring portion 129 monitors the application processing portion 121 and transmits a trouble notification to the trouble analysis apparatus 40 when detecting trouble.

The computer hardware 200 of the client 20 is constituted from a network card 201, a HDD 202, a CPU 203, a main memory 204 and a trouble monitoring portion 209. The network card 201, the HDD 202, the CPU 203 and the main memory 204 are functional elements belonging to the computer hardware 200 of the client 20. It should be noted that the trouble monitoring portion 209 monitors the network card 201, the HDD 202, the CPU 203 and the main memory 204 and transmits a trouble notification to the trouble analysis apparatus 40 when detecting a trouble regarding such functional elements.

The operating system 210 of the client 20 is constituted from a network driver 211, a HDD driver 212, a network protocol 213, a memory management portion 214 and a trouble monitoring portion 219. The network driver 211, the HDD driver 212, the network protocol 213 and the memory management portion 214 are functional elements belonging to the operating system 210 of the client 20. It should be noted that the trouble monitoring portion 219 monitors the network driver 211, the HDD driver 212, the network protocol 213 and the memory management portion 214 and transmits a trouble notification to the trouble analysis apparatus 40 when detecting trouble regarding such functional elements.

The client application 220 of the client 20 is constituted from an application processing portion 221 and a trouble monitoring portion 229. The application processing portion 221 is a functional element belonging to the client application 220 of the client 20. It should be noted that the trouble monitoring portion 229 monitors the application processing portion 221 and transmits a trouble notification to the trouble analysis apparatus 40 to the trouble analysis apparatus 40 when detecting trouble.

The switch hardware 300 of the switch 30 is constituted from network interfaces (NWI/F) 301-303, a switch fabric 304, a CPU 305, a memory 306 and a trouble monitoring portion 309. The network interfaces 301-303, the switch fabric 304, the CPU 305 and the memory 306 are functional elements belonging to the switch hardware 300 of the switch 30. It should be noted that the trouble monitoring portion 309 monitors the network interfaces 301-303, the switch fabric 304, the CPU 305 and the memory 306 and transmits a trouble notification to the trouble analysis apparatus 40 when detecting trouble regarding such functional elements.

The operating system 310 of the switch 30 is constituted from a switch driver 311, a memory management portion 312 and a trouble monitoring portion 319. The switch driver 311 and the memory management portion 312 are functional elements belonging to the operating system 310 of the switch 30. It should be noted that the trouble monitoring portion 319 monitors the switch driver 311 and the memory management portion 312 and transmits a trouble notification to the trouble analysis apparatus 40 when detecting trouble regarding such functional elements.

The switch application 320 of the switch 30 is constituted from a routing protocol 321 and a trouble monitoring portion 329. The routing protocol 321 is a functional element belonging to the switch application 320 of the switch 30. It should be noted that the trouble monitoring portion 329 monitors the routing protocol 321 and transmits a trouble notification to the trouble analysis apparatus 40 when detecting trouble. Further, the routing protocol 321 is a processing portion (a computer program which is designed to implement the RIP2 operations) for processing, for example, RIP2 operations or is a management portion (management program) of the processing portion.

A cable 2 connects the network card 101 of the server 10 with the network interface 301 of the switch 30. A cable 3 connects the network card 201 of the client 20 with the network interface 303 of the switch 30. In addition, a system configuration management apparatus 60 is connected to one end of a cable 4 which is connected to the network interface 302 of the switch 30. It should be noted that the system configuration management apparatus 60 conducts management operations of updating the system configuration of the multilayer system 1. Therefore, for example, the cable 4 is used for transmitting and receiving information, such as system setting information transmitted from the system configuration management apparatus 60.

As described above, in the multilayer system 1, the functional elements belonging to layers of the server 10, the client 20 and the switch 30 conducts operations by cooperating each other. In addition, when there is trouble in one functional element of the multilayer system 1, the trouble spreads on related functional elements, and each of the trouble monitoring portions transmits the trouble notification to the trouble analysis apparatus 40.

FIG. 11 is a drawing for explaining a trouble analysis apparatus 40 which is an example of a conventional analysis apparatus. FIG. 12 is a drawing showing an example of information stored in a trouble analysis table 403 included in the trouble analysis apparatus 40. The trouble analysis apparatus 40 includes a trouble collection portion 401, a trouble searching portion 402, a trouble analysis table 403 and a trouble notification portion 404. The trouble collection portion 401 collects trouble notifications from the multilayer system 1. As shown in FIG. 12, the trouble analysis table 403 is constituted from entries including multiple trouble notification sources 1, 2, 3, . . . , N and presumable specific trouble spots 1 and 2. For example, TABLE NO. 1 shows that when trouble notifications are received from both the network interface 301 and the network card 101, a presumed point of the trouble is the cable 2 or the switch hardware 300. The search portion 402 conducts a trouble spot presuming search operation in reference to the trouble analysis table 403 based on the collected trouble notifications. The trouble notification portion 404 notifies both the trouble notification and presumed-specific-trouble-point information that shows a trouble source functional element (functional element which is a source of the trouble) searched for by the search portion 402. In other words, regarding the trouble analysis apparatus 40, operators set the trouble analysis table 403 beforehand based on past experiences (inputting presumed results of the trouble spots regarding multiple elements of troubles), and the trouble spot is shown by using the trouble analysis table 403 when trouble occurs.

The conventional trouble analysis method is a method in which an operator recognizes a trouble notification and determines a trouble spot based on his experiences, or in which, as described in the trouble analysis apparatus 40 above, an operator defines specific trouble spots corresponding to multiple trouble events beforehand so as to improve efficiency of operations of detecting trouble spots.

FIG. 13 is a flowchart showing an example of operations of the trouble analysis apparatus 40 which is an example of a conventional analysis apparatus. FIG. 14 is a flowchart showing operations conducted by the operator after notification by the trouble analysis apparatus 40 regarding a trouble spot. FIG. 14 shows a flowchart which shows an operation flow from a system operation step to detection of a trouble spot after occasion of trouble.

First, to start the trouble analysis apparatus 40, a setting operation on the trouble analysis table 403 of the trouble monitoring apparatus 40 is conducted by the operator so as to conform to a system. In other words, the trouble analysis table 403 of the trouble monitoring apparatus 40 is generated based on input by the operator (step S101). After this, the trouble analysis apparatus is in an operating status.

While the trouble analysis apparatus 40 is in an operating state, if a system configuration is changed by using the system configuration management apparatus 60, operation of setting the trouble analysis table 403 of step S101 is conducted again.

While the trouble analysis apparatus 40 is in an operating state, if trouble occurs in the multilayer system 1, the trouble is spread between the functional elements, and multiple troubles are detected through trouble monitoring operations of the multilayer system 1. After this, multiple trouble notifications are transmitted from the switch 30 to the trouble analysis apparatus 40. In other words, the trouble collection portion 401 collects (receives) multiple trouble notifications from the switch 30 (step S102).

The search portion 402 determines the trouble spot in reference to the trouble notifications and the trouble analysis table 403. The trouble notification portion 404 of the trouble analysis apparatus notifies the operator of both the trouble notifications and the presumed-specific-trouble-point information (step S106).

The trouble notification portion 404 of the trouble analysis apparatus 40 shows the operator both the trouble notifications and the presumed-specific-trouble-point information. As shown in FIG. 14, if the trouble spot notified by using the presumed-specific trouble-point information is true (appropriate), the operator conducts recovery operations of the corresponding trouble spot (operation 1). However, if the trouble spot notified by using the presumed-specific trouble-point information is not true, the operator conducts checking operations on the trouble spots regarding all trouble notifications (operation 2). First, the operator conducts a trouble spot determination operation (operation 4) by conducting checking operations (operation 3) on the hardware, on the software and inside of each layer.

If the trouble spot determined in a step of the operation 4, the operator conducts recovering operations on the trouble spot (operation 5). However, if the trouble spot determined in a step of the operation 4 is not true, the operator conducts checking operations (operation 6) in consideration of relationship between layers, changes the layer on which the checking operations are conducted and conducts checking operations (operation 3) again on the changed layer. In accordance with such operations, the operator repeatedly conducts checking operations on the inside of the layers and checking operations based on relationship between layers, narrows the range of suspicious trouble spots and determines the trouble spot (operation 4).

It should be noted that the patent document 1 describes an apparatus which presumes a range of affected area by trouble on a system constituted from multiple multilayer apparatuses. In addition, the patent document 2 describes an analysis technique which, when a system trouble is raised, analyzes the range of the affected area of the system trouble.

[Patent Document 1] Japanese Patent Application, First Publication No. 2000-069003

[Patent Document 2] Japanese Patent Application, First Publication No. 2005-258501

SUMMARY OF THE INVENTION

First, regarding a method in which an operator recognizes a trouble notification and determines a trouble spot based on his experiences, there is a limitation because the method is based on the knowledge of a person. For example, there is a problem in which the method can only applied to troubles similar to the troubles which occurred in the past. In addition, if the multilayer system which is monitored is extended and/or is complicated, there are presumably difficulties when detecting a trouble spot.

In addition, when a method similar to the above-described trouble analysis apparatus 40 is used in which the operator defines the trouble spots corresponding to multiple specific trouble events beforehand, it is necessary for the operator to closely examine and define relationship between the trouble events and the specific trouble spots beforehand. However, such examining and defining operations by the operator are limited due to, for example, knowledge. Therefore, as a result, a conventional trouble analysis apparatus, for example, the trouble analysis apparatus 40 can be applied only to troubles included in a scope which is presumed by the operator. Further, closely examining operations and defining operations (registration operations) of relationship between the trouble events and the specific trouble spots are troublesome. When a system configuration is updated, there is a possibility in which close examining operations and defining operations are necessary again and are troublesome.

The present invention has an object to propose a trouble analysis apparatus which can be applied to a wide range of troubles and in addition, has an object proposing a trouble analysis apparatus which requires little energy and little labor to the operator.

To solve the above-described problems, solutions shown below are proposed.

A first solution is a trouble analysis apparatus including: a system topology storing portion storing system topology information which is information indicating a system topology and which is constituted from both functional elements regarding hardware and software belonging to apparatuses that constitute the system and links between the functional elements; an error detection information receiving portion collecting error detection information with regard to error functional elements that are functional elements indicating error operations; and a trouble source determination portion which, based on both the error detection information collected by the error detection information receiving portion and system topology information stored in the system topology information storing portion, determines a trouble source functional element that is presumed as a functional element which is a source of a system trouble, wherein links included in the system topology information have information indicating spreading directions of error operations between the functional elements when trouble occurs, and when the trouble source detection portion receives the error detection information with regard to multiple error functional elements, the trouble source determination portion sequentially selects one of the multiple error functional elements, determines whether or not directions from the selected error functional element to other error functional elements conform to the spreading directions included in the system topology information, and determines the selected error functional element as the trouble source functional element when the spreading directions are conformable.

A second solution is the above-described trouble analysis apparatus in which the system topology information does not include information regarding layers and apparatuses to which the functional elements belong.

A third solution is the above-described trouble analysis apparatus further including a trouble topology information generation portion which generates trouble topology information that is a portion of the system topology information constituted from both the multiple error functional elements and the links between the multiple error functional elements in reference to the system topology information when the trouble detection information receiving portion receives the trouble notifications with regard to multiple error functional elements, wherein when the trouble detection information receiving portion receives multiple trouble notifications regarding multiple error functional elements, the trouble source determination portion sequentially selects one of the multiple error functional elements and determines whether or not directions from the selected error functional element to other functional elements which are not selected conform to spreading directions included in the trouble topology information, and if the trouble source determination portion determines that they are conformable, the trouble source determination portion determines that the currently selected trouble functional element is the trouble source functional element.

A fourth solution is the above-described trouble analysis apparatus further including: a basic topology information storing portion which, with regard to each layer included in each apparatus constituting the system, stores basic topology information constituted from both the functional elements belonging to the layer and links between the functional elements included in the layer; and a system topology information generation portion generating the system topology information in reference to both information indicating a system configuration and the basic topology information stored in the basic topology information storing portion.

A fifth solution is the above-described trouble analysis apparatus, wherein the system topology information generation portion updates the system topology information stored in the system topology information storing portion so as to be in a tree structure in reference to the multiple error functional elements.

In the above-described solutions, the trouble spot is not determined based on a relationship between the trouble events and the specific trouble spots. In the above-described solutions, the trouble spot is determined based on the system topology information (a concept of propagation directions of error operations). Therefore, it is possible to handle very wide range of troubles. In addition, small amount of load and labor are required to the operator because it is not necessary to conduct closely examining operations and defining operations on relationship between the trouble events and the specific trouble spots.

BRIEF DESCRIPTION OF THE DRAWINGS

FIG. 2 is a drawing showing an example of information stored in a basic topology information storing portion.

FIG. 3 is a graph of the basic topology information of computer hardware.

FIG. 8 is a flowchart showing an example of operations of the trouble analysis apparatus.

FIG. 12 is a drawing showing an example of information stored in a trouble analysis table of the trouble analysis apparatus which is an example of a conventional analysis apparatus.

FIG. 14 is a flowchart showing operations conducted by an operator after notification of a trouble spot in a case in which the trouble analysis apparatus is used which is an example of a conventional analysis apparatus.

DETAILED DESCRIPTION OF THE INVENTION

Figure 1:
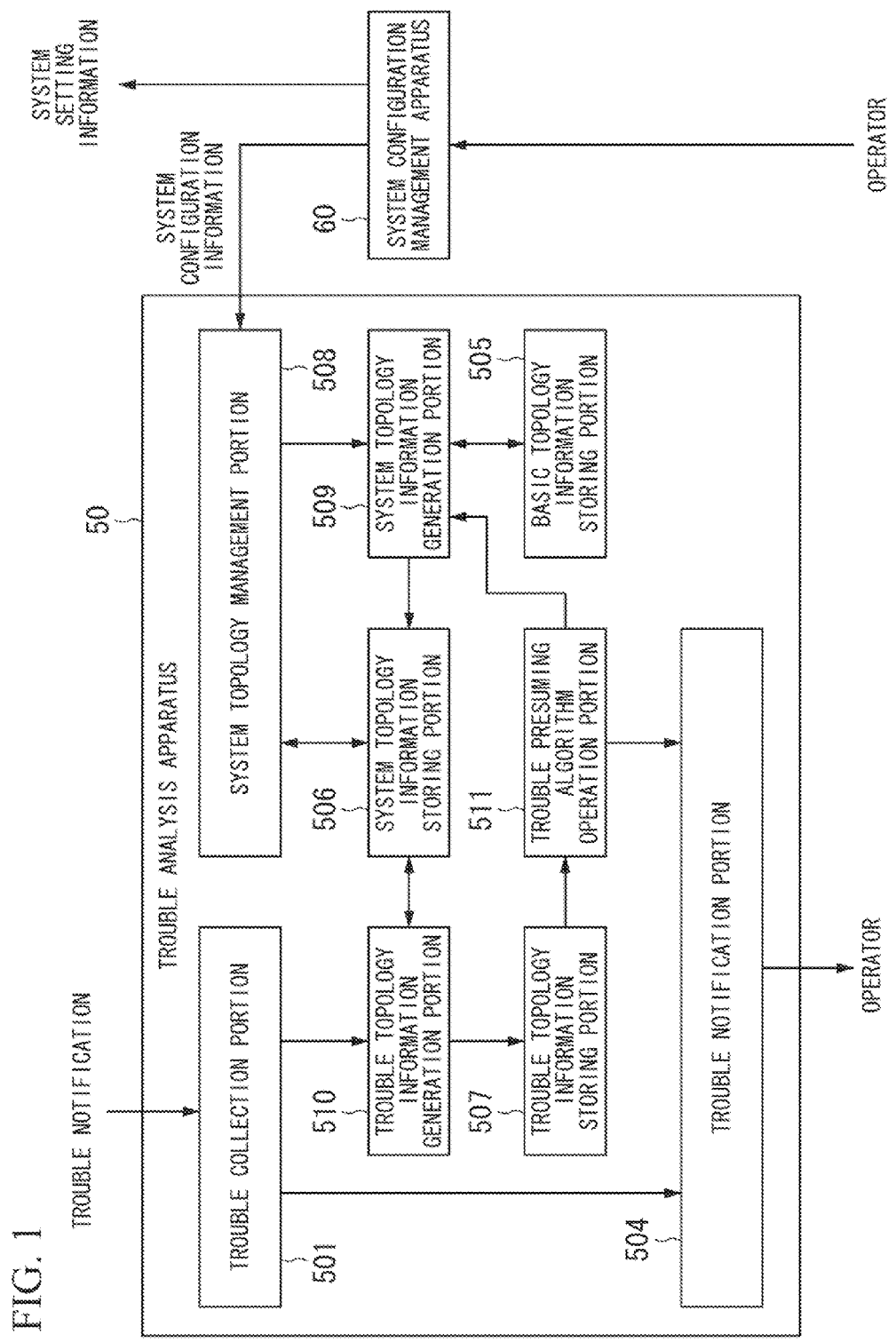
FIG. 1 is a block diagram of a trouble analysis apparatus.

FIG. 1 is a block diagram of a trouble analysis apparatus 50 in one embodiment. FIG. 2 shows one example of information stored in a basic topology information storing portion 505. The trouble analysis apparatus 50, mainly in reference to system model (system topology information) constituted from both functional elements of all layers from hardware to software belonging to apparatuses that constitute the system and a link between functional elements, determines a functional element (trouble source functional element) which is presumed to be a trouble cause.

Figure 10:
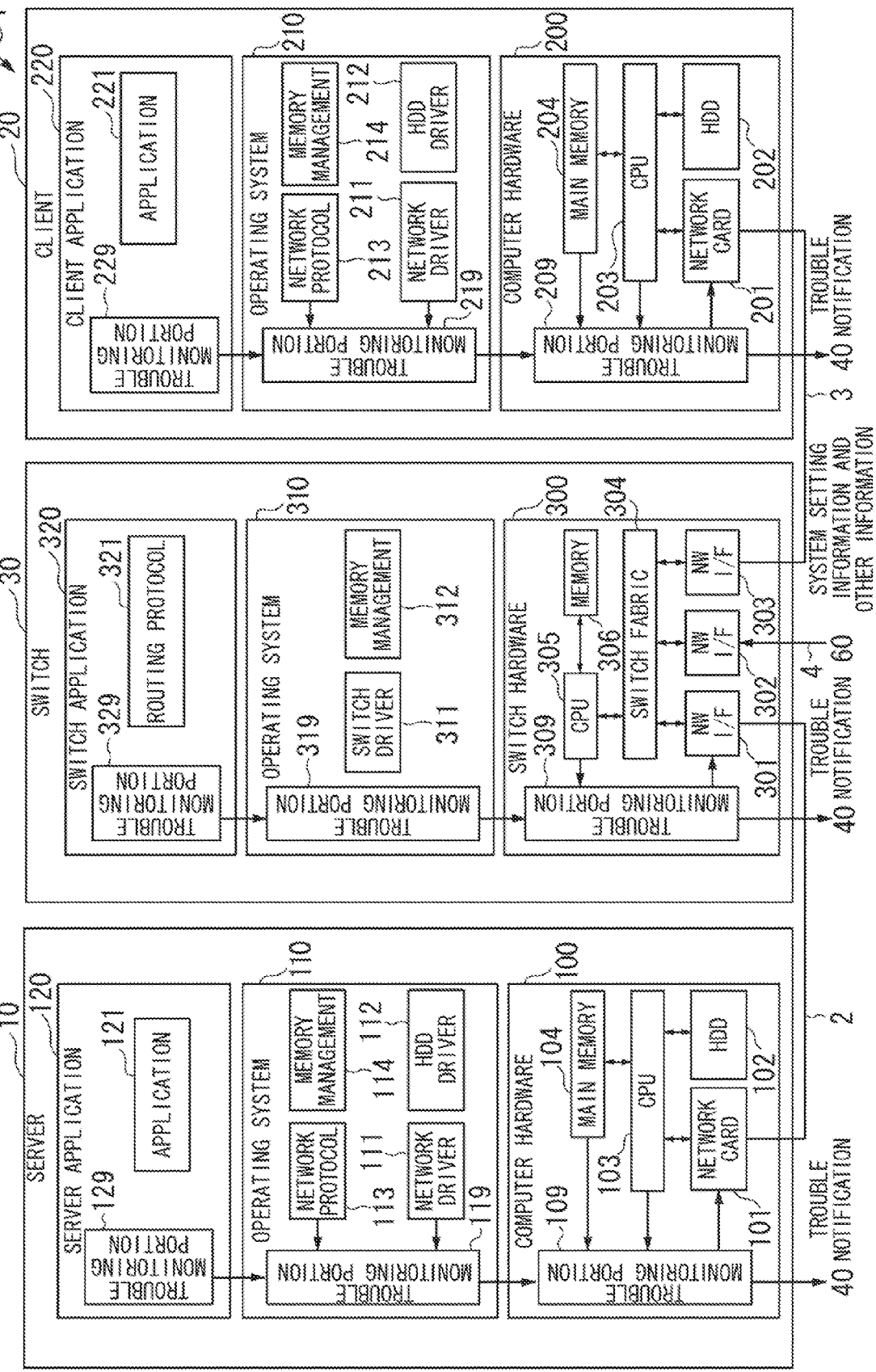
FIG. 10 is a drawing for explaining a multilayer system 1 which is an example of a multilayer system and which has a client-server system configuration.
Figure 11:
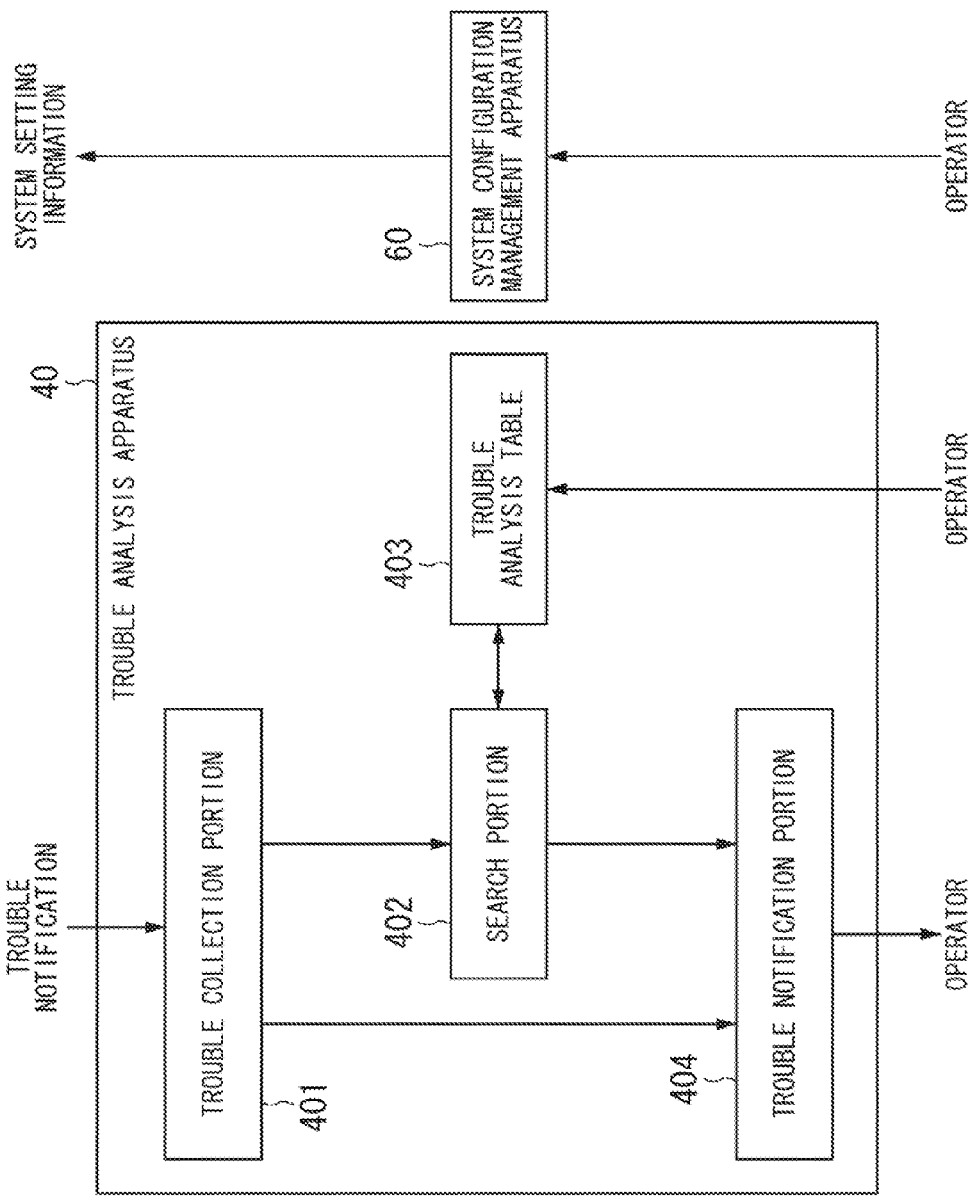
FIG. 11 is a drawing for explaining a trouble analysis apparatus which is an example of a conventional analysis apparatus.
Figure 13:
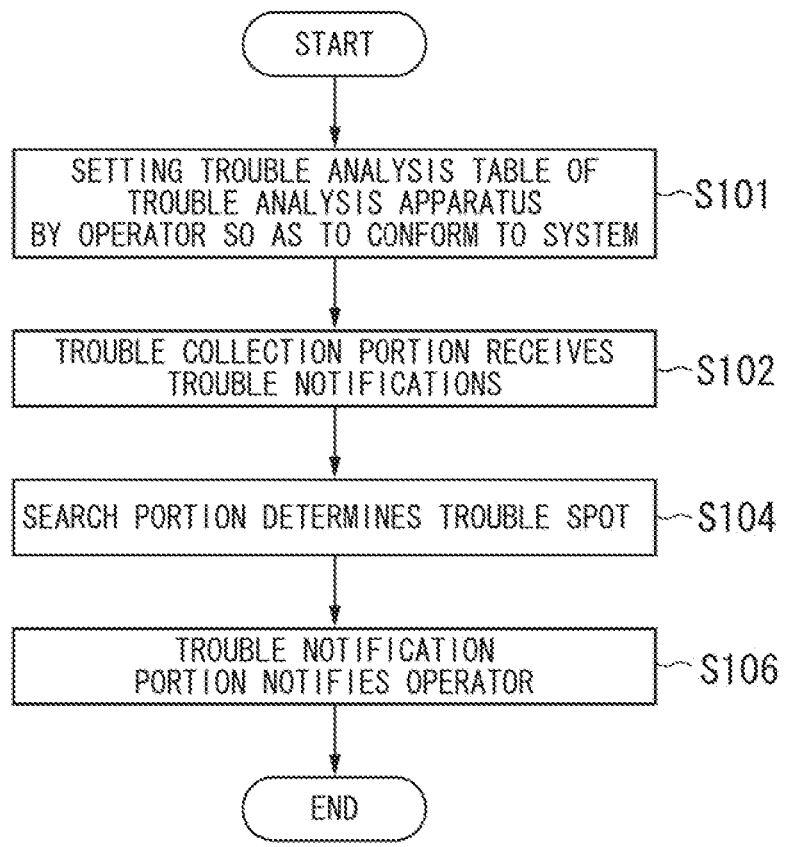
FIG. 13 is a flowchart showing an example of operations of the trouble analysis apparatus which is an example of a conventional analysis apparatus.

Concretely, as shown in FIG. 1, the trouble analysis apparatus 50 includes a trouble collection portion 501 (corresponding to an error detection information receiving portion of the present invention), a trouble notification portion 504, a basic topology information storing portion 505, a system topology information storing portion 506, a trouble topology information storing portion 507, a system topology management portion 508, a system topology generation portion 509, a trouble topology information generation portion 510, and a trouble presuming algorithm operation portion 511 (corresponding to a trouble source determination portion). It should be noted that in the following explanations, the trouble analysis apparatus 50 analyzes troubles of the multilayer system 1 shown in FIG. 10.

The trouble collection portion 501 corresponds to a trouble collection portion 401 of a conventional trouble analysis apparatus 40. In other words, the trouble collection portion 501 collects trouble notifications from the multilayer system 1.

The basic topology information storing portion 505 stores basic topology information which is constituted from both the functional elements of all layers belonging to the apparatuses (server 10, client 20 and switch 30) that constitute the multilayer system 1 and a link between functional elements of all layers. Concretely, the basic topology information storing portion 505 stores, for example, the basic topology information shown in FIG. 2. The basic topology information described in a table form is applied to manage both each layer of each apparatus and the topology information so as to have a one-to-one correspondence. For example, "Table No. 1" is an entry of the topology information corresponding to the computer hardware 100. Further, "Table No. 2" is an entry of the topology information corresponding to the switch hardware 300. "< >" shown in FIG. 2 included in the topology information indicates a link. For example, in the topology information of "Table No. 1" (topology information corresponding to the computer hardware 100), it is indicated that the main memory 104 is linked to both the CPU 103 and the operating system memory management. Further, the HDD 102 is linked to both the CPU 103 and the operating system. Further, each link includes information which indicates a propagation direction of an error operation (spreading direction of trouble) inside the functional elements when trouble occurs.

Hereafter, operations of defining the basic topology information are explained. When the functional elements are defined, it is expected that the functional elements are a group which includes hardware, software and functions and which has a worthy size for trouble monitoring/detecting. Further, the propagation direction (direction of spreading the trouble) upon error operations is defined (set) with respect to each link regardless of the size of the functional element and the layer to which the functional element belongs. For example, at a level of the system, a function constitution element is defined as a functional element, and a connection relationship is defined as a link. At a level of hardware, for example, hardware module blocks and trouble detection registers are defined as functional elements, and relationship between the hardware module blocks and the trouble detection registers is defined as a link. At a level of software, functions and trouble detection valuables are defined as functional elements, and relationship between the functions and the trouble detection valuables are defined as a link. In accordance with such definitions, it is possible to easily generate the system topology information by linking the basic topology information. In addition, accuracy of the basic topology information is improved if the relationship between the functional elements and the link is further accurately extracted based on the design information of hardware and software. However, if the design information is not clear, it is possible to define the basic topology information based on, for example, a physical connection state and operational relationship.

The system topology management portion 508 receives the system configuration information from the system configuration management apparatus 60. Concretely, if the configuration of the multilayer system 1 is updated while operating, the system topology management portion 508 receives the system configuration information from the system configuration apparatus 60. It should be noted that, in the similar manner as the conventional system, the operator conducts updating/managing operations of the system configuration by using the system configuration management apparatus 60. Further, it is possible that the system topology management portion 508 saves the received system configuration information.

In reference to the system configuration of the multilayer system 1 and the basic topology information stored in the basic topology information storing portion 509, the system topology information generation portion 509 generates the system topology information which is the topology information of the overall system and which does not include information with regard to the apparatus and the layer to which each functional element belongs. Each link of the system topology information includes information which indicates the spreading direction of the error operation inside the functional element when trouble is occurred. The system topology information generation portion 509 stores the generated system topology information in the system topology information storing portion 506.

Further, in consideration of a case in which the trouble collection portion 501 receives the trouble notifications with regard to multiple functional elements that raise the errors, it is possible to design the system topology information generation portion 509 so as to generate the system topology information with a tree structure. It should be noted that if the system topology information is formed in a tree structure, an operation speed of the trouble presuming algorithm operation portion 511 (described below) is improved.

Figure 4:
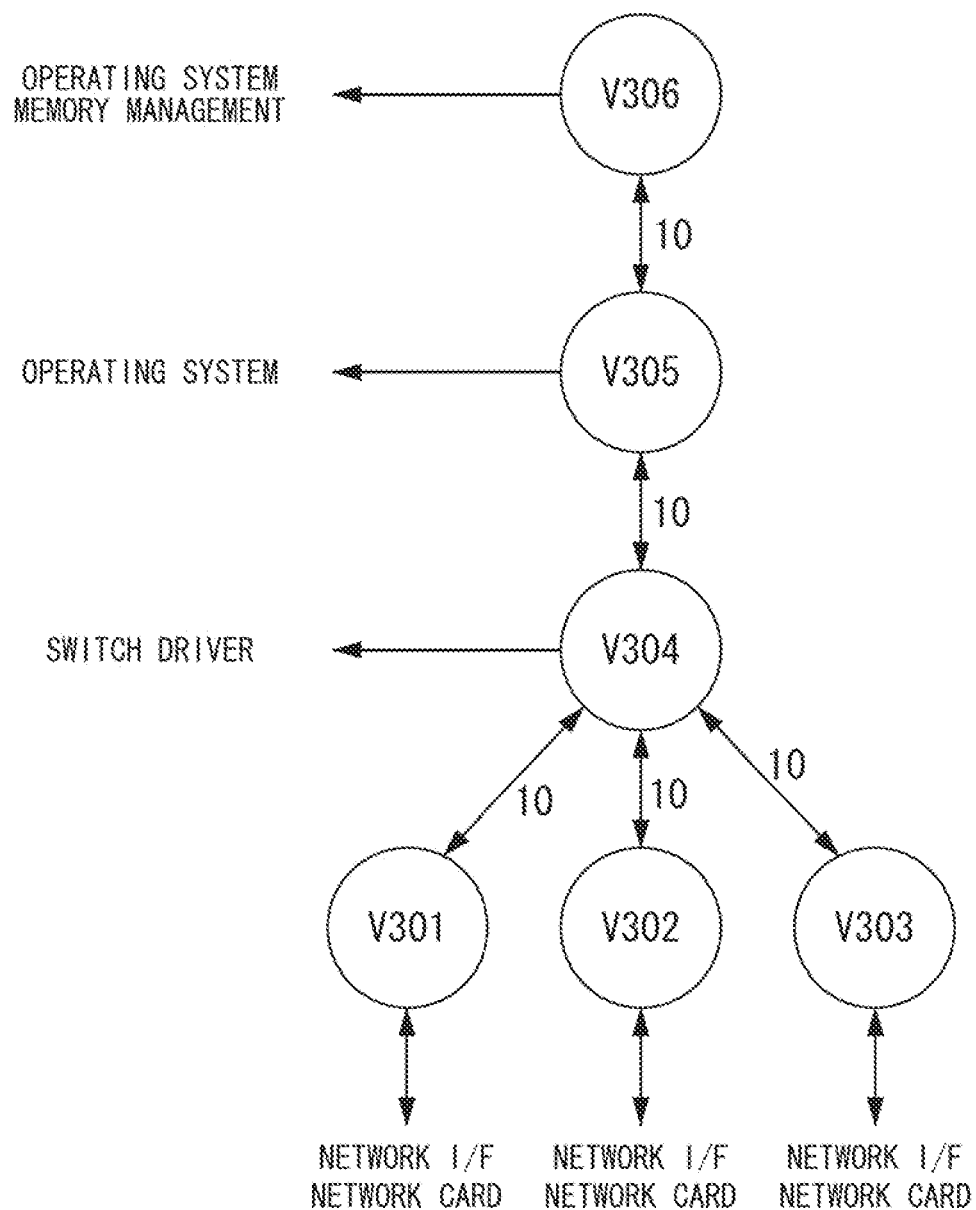
FIG. 4 is a graph of the basic topology information of switch hardware.
Figure 5:
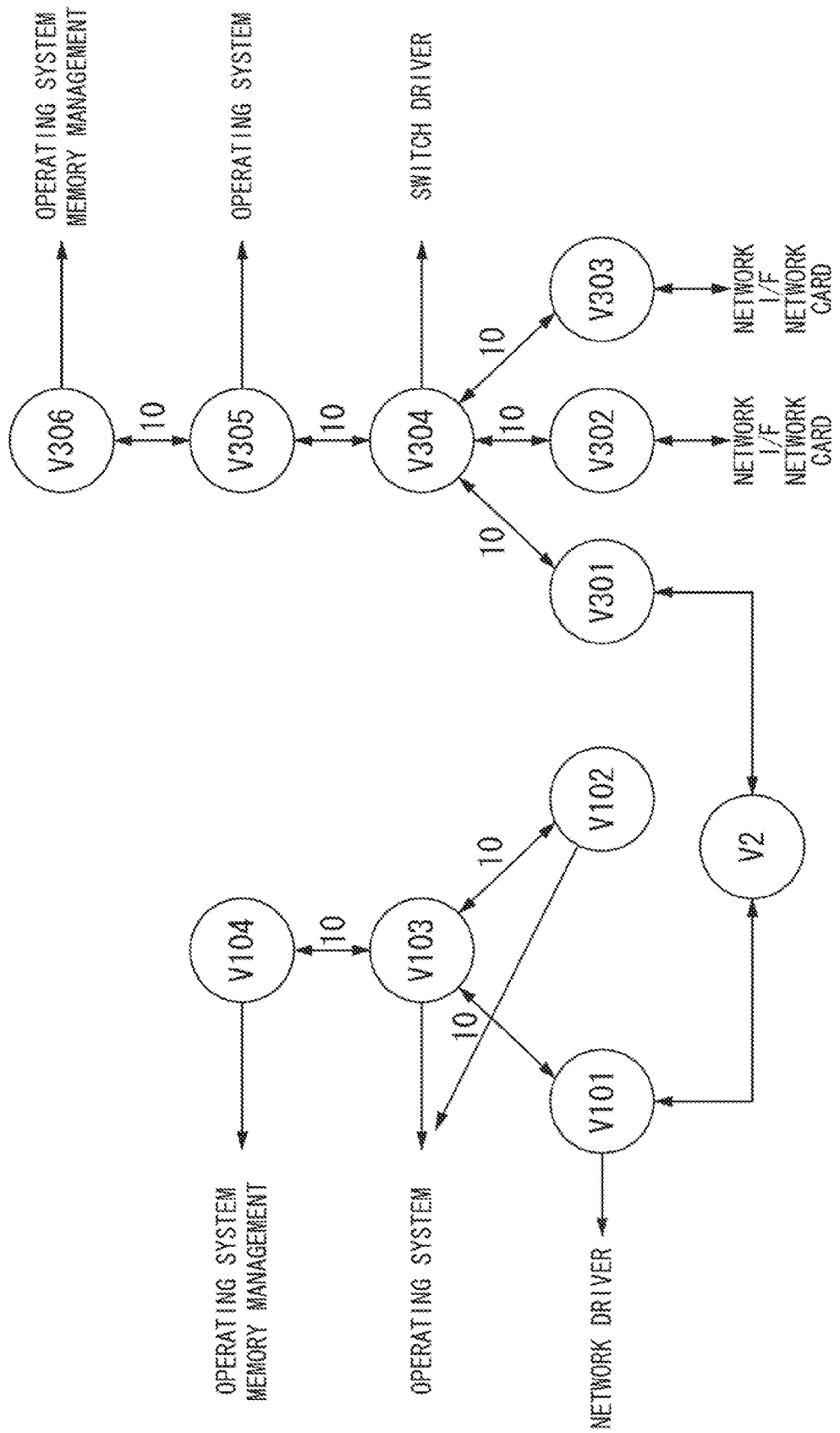
FIG. 5 is a graph of a portion of system topology information.

Hereinafter, operation steps of generating the system topology information are explained. FIG. 3 is a graph of the basic topology information of the computer hardware 100. FIG. 4 is a graph of the basic topology information of a switch hardware 300. FIG. 5 is a graph of a portion of the system topology information. It should be noted that in the graphs of FIGS. 3-5, the functional elements are indicated by nodes, and the relationship between the nodes is shown by the links of the arrows. Further, directions of the links of the arrows are spreading directions of the error operations. Hereinafter, steps of operations of generating system topology information with regard to the computer hardware 100 and the switch hardware 300 that are a portion of the multilayer system 1 are explained.

The system topology information generation portion 509 receives the information regarding the currently operating system configuration form the system topology management portion 508, divides the information into functional elements, for example, hardware resource, software resource and application resource that constitute the system, and generates a graph of the basic topology information of the computer hardware 100 based in the table "No. 1" of the topology information stored in the basic topology storing portion 505. Further, based on the topology information of the table "No. 2" of the basic topology information storing portion 505, a graph of the basic topology information of the switch hardware 300 shown in FIG. 4 is generated.

After this, the system topology information generation portion 509 connects (links) between the basic topology information of the generated computer hardware 100 and the basic topology information of the switch hardware 300 at points where they can be connected/linked. Concretely, the system topology information generation portion 509 connects a node V101 corresponding to the network card 101 to a node V301 corresponding to the network interface 301 by using a node V2 corresponding to the cable 2, and generates the system topology information shown in FIG. 5. It should be noted that the system topology information shown in FIG. 5 does not include information regarding an apparatus and a layer to which each functional element belongs (for example, information regarding the apparatus (server 10) and the layer (computer hardware 100) is not included to which V101 belongs). It should be noted that, by the system topology information generation portion 509, the information which indicates that the network card 101 (V101) can be connected to the network interface 301 (V301) is included in the above-described information of the system configuration received from the system topology management portion 508. In accordance with the same manner, the system topology information generation portion 509 generates the system topology information of the overall multilayer system 1 shown in FIG. 10.

If the trouble collection portion 501 receives the trouble notifications with regard to multiple error functional elements (functional elements in that the error operations are indicated), the trouble topology information generation portion 510 in reference to the system topology information, generates the trouble topology information (topology information which is a portion of the system topology information) based on both the multiple error functional elements and the links between the multiple error functional elements. Each link of the trouble topology information includes information which indicates the spreading direction of the error operation (spreading direction of the trouble) inside the functional element when trouble is occurred. The trouble topology information generation portion 510 stores the generated trouble topology information in the trouble topology information storing portion 507.

Figure 6A:
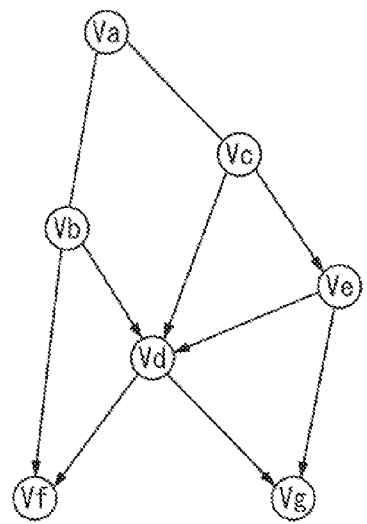
FIG. 6A is a drawing for explaining generation steps of trouble topology information.
Figure 6B:
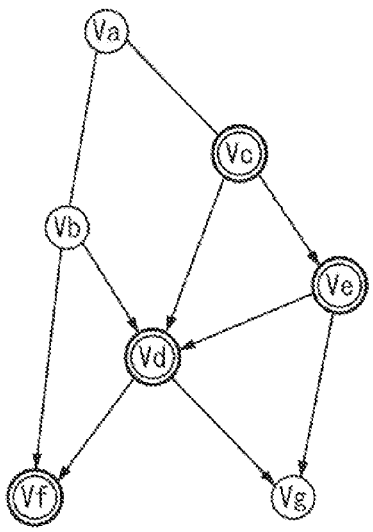
FIG. 6B is a drawing for explaining generation steps of trouble topology information.
Figure 6C:
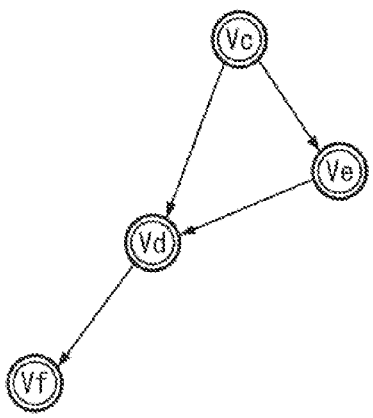
FIG. 6C is a drawing for explaining generation steps of trouble topology information.

Hereinafter, generation steps of the trouble topology information are explained. FIG. 6 is a drawing for explaining the generation steps of the trouble topology information. It should be noted that the functional elements of "Va", "Vb", "Vc", "Vd", "Ve", "Vf" and "Vg" shown in FIG. 6 are used for explaining the generation steps of the trouble functional elements and do not correspond to the functional elements of the multilayer system 1 shown in FIG. 10. The same explanations are applied to the functional elements of "Vb", "Vc", "Vd", "Ve" and "Vf" shown in FIG. 7.

If the trouble collection portion 501 receives the trouble notifications with regard to the error functional elements of "Vc", "Vd", "Ve" and "Vf", the trouble topology information generation portion 510 receives the trouble notifications with regard to the error functional elements of "Vc", "Vd", "Ve" and "Vf" from the trouble collection portion 501. After receiving the trouble notifications with regard to the error functional elements of "Vc", "Vd", "Ve" and "Vf" from the trouble collection portion 501, the trouble topology information generation portion 510 extracts only the error functional elements of "Vc", "Vd", "Ve" and "Vf" as shown in FIG. 6B from the functional elements of "Va", "Vb", "Vc", "Vd", "Ve", "Vf" and "Vg" included in the topology information shown in FIG. 6A. After this, the trouble topology information generation portion 510 generates the trouble topology information as shown in FIG. 6 based on both the error functional elements of "Vc", "Vd", "Ve" and "Vf" and the links between the error functional elements. It should be noted that it is possible to consider the trouble topology information generated by the trouble topology information generation portion 510 as a system model showing the spread of trouble.

When the trouble collection portion 501 receives multiple trouble notifications regarding multiple error functional elements, the trouble presuming algorithm operation portion 511 sequentially selects one of the multiple error functional elements and determines whether or not directions from the selected error functional element to other functional elements which are not selected conform to spreading directions included in the trouble topology information, and if the trouble presuming algorithm operation portion 511 determines that they are conformable, the trouble presuming algorithm operation portion 511 determines that the currently selected trouble functional element is the trouble source functional element (functional element which is supposed as a cause or source of the system trouble).

Hereinafter, explanation is described with a concrete example. FIGS. 7A-E are drawings for explaining an algorithm of the trouble presuming algorithm operation portion 511. If the trouble collection portion 501 receives the trouble notifications regarding the trouble functional elements of "Vc", "Vd", "Ve" and "Vf", the trouble presuming algorithm operation portion 511 selects, for example, the trouble functional element of "Vd" from the trouble functional elements of "Vc", "Vd", "Ve" and "Vf".

Figure 7A:
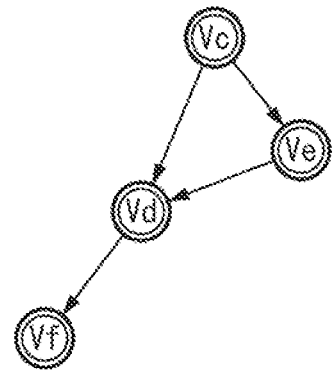
FIG. 7A is a drawing for explaining an algorithm of a trouble presuming algorithm operation portion.
Figure 7B:
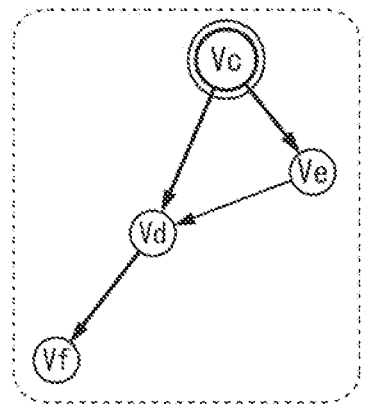
FIG. 7B is a drawing for explaining an algorithm of the trouble presuming algorithm operation portion.
Figure 7C:
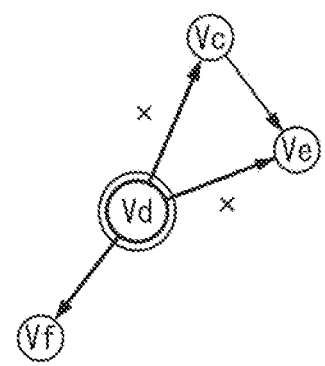
FIG. 7C is a drawing for explaining an algorithm of the trouble presuming algorithm operation portion.
Figure 7D:
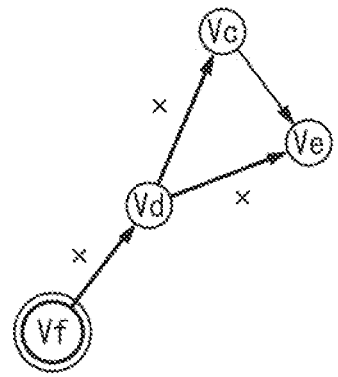
FIG. 7D is a drawing for explaining an algorithm of the trouble presuming algorithm operation portion.

As shown in FIG. 7C, the trouble presuming algorithm operation portion 511 determines that a link direction (spreading direction) from the trouble functional element of "Vd" to the trouble functional element of "Vf" conforms to link directions of trouble topologies shown in FIG. 7A. However, the trouble presuming algorithm operation portion 511 determines that both a link direction from the trouble functional element of "Vd" to the trouble functional element of "Vc" and a link direction from the trouble functional element of "Vd" to the trouble functional element of "Ve" do not conform to link directions of trouble topologies shown in FIG. 7A. Therefore, the trouble presuming algorithm operation portion 511 does not determine the error functional element of "Vd" as the trouble source functional element. It should be noted that the trouble topology information shown in FIG. 7A is generated by the trouble topology information generation portion 510 as described above.

After this, the trouble presuming algorithm operation portion 511 selects, for example, the trouble functional element of "Vf". The trouble presuming algorithm operation portion 511 determines that a link direction from the trouble functional element of "Vf" to the trouble functional element of "Vd", a link direction from the trouble functional element of "Vd" to the trouble functional element of "Vc" and a link direction from the trouble functional element of "Vd" to the trouble functional element of "Ve" do not conform to link directions of trouble topologies shown in FIG. 7A. Therefore, the trouble presuming algorithm operation portion 511 does not determine the error functional element of "Vf" as the trouble source functional element.

Figure 7E:
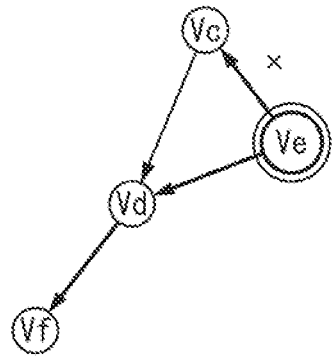
FIG. 7E is a drawing for explaining an algorithm of the trouble presuming algorithm operation portion.

After this, the trouble presuming algorithm operation portion 511 selects, for example, the trouble functional element of "Ve". As shown in FIG. 7E, the trouble presuming algorithm operation portion 511 determines that both a link direction from the trouble functional element of "Ve" to the trouble functional element of "Vd" and a link direction from the trouble functional element of "Vd" to the trouble functional element of "Vf" conform to link directions of trouble topologies shown in FIG. 7A. However, the trouble presuming algorithm operation portion 511 determines that a link direction from the trouble functional element of "Ve" to the trouble functional element of "Vc" does not conform to link directions of trouble topologies shown in FIG. 7A. Therefore, the trouble presuming algorithm operation portion 511 does not determine the error functional element of "Ve" as the trouble source functional element.

After this, the trouble presuming algorithm operation portion 511 finally selects the trouble functional element of "Vc". As shown in FIG. 7B, the trouble presuming algorithm operation portion 511 determines that all of a link direction from the trouble functional element of "Vc" which is currently selected to the trouble functional element of "Vd", a link direction from the trouble functional element of "Vc" to the trouble functional element of "Vc" and a link direction from the trouble functional element of "Vd" to the trouble functional element of "Vf" conform to link directions of trouble topologies shown in FIG. 7A. Therefore, the trouble presuming algorithm operation portion 511 determines the error functional element of "Vc" as the trouble source functional element.

In other words, only when the error functional element of "Vc" is assumed as the trouble source functional element, the trouble presuming algorithm operation portion 511 determines that conforms to the spreading direction included in the trouble topology information. Therefore, the trouble presuming algorithm operation portion 511 determines the error functional element of "Vc" as the trouble source functional element. It should be noted that if the system topology information has a tree structure (that is, the trouble topology information has also a tree structure), operations of the algorithm operation portion 511 is comparatively fast. This is because the total number of links is comparatively small in a tree structure, and a number of determining conformity as described above is comparatively small.

The trouble notification portion 504 notifies the operator of both the trouble notifications and the presumed-specific trouble-point information which indicates the trouble source functional element determined by the trouble presuming algorithm operation portion 511.

Hereinafter, operations of the trouble analysis apparatus 50 are explained. FIG. 8 is a flowchart showing an example of operations of the trouble analysis apparatus 50 in one embodiment of the present invention. The flowchart of FIG. 8 shows operations of determining a trouble spot when trouble occurs in a system operation step.

While the trouble analysis apparatus 50 is in an operating state, if trouble occurs in the multilayer system 1, the trouble is spread between the functional elements, and the multiple troubles are detected by the trouble monitoring portions of the multilayer system 1. Due to this, the trouble notifications regarding multiple functional elements are transmitted to the trouble analysis apparatus 50. In other words, the trouble collection portion 501 collects (receives) the trouble notifications regarding multiple error functional elements (Step S202). It should be noted that while the trouble analysis apparatus 50 is in an operating state, the latest system topology information of the multilayer system 1 is stored in the system topology information storing portion 506 (when the configuration of the multilayer system 1 is updated while operating, the system topology management portion 508 receives the system configuration information, the system topology information generating portion 509 generates the latest system topology information again, and the latest system topology information is stored in the system topology information storing portion 506).

The trouble topology information generation portion 510 generates the trouble topology information in reference to both the trouble notifications and the system topology information stored in the system topology information storing portion 506 (Step S203). The trouble topology information generation portion 510 stores the generated trouble topology information in the trouble topology information storing portion 507.

The trouble presuming algorithm operation portion 511 sequentially selects one of the multiple error functional elements and determines whether or not directions from the selected error functional element to other functional elements which are not selected conform to spreading directions included in the trouble topology information. If the trouble presuming algorithm operation portion 511 determines that they are conformable, the trouble presuming algorithm operation portion 511 determines that the currently selected trouble functional element is the trouble source functional element (Step S204).

Further, the system topology information generation portion 509 updates the system topology information so as to be a tree structure if necessary (Step S205). For example, one of two links of the system topology information from the functional element of "Vc" to the functional element of "Vd" shown in FIG. 6A is temporally closed (it is assumed that the link does not exist). For example, if the trouble collection portion 501 receives the trouble notifications indicating the error functional elements of "Vc", "Vd" and "Vf", the system topology information generation portion 509 temporally closes a link from the functional element of "Vc" to the functional element of "Ve". This is because the error operation is not spread from the error functional element of "Vc" to the error functional element of "Ve".

It should be noted that it is possible for the system topology generation portion 509 to update the system topology information so as to be a tree form by assigning factors to the links (numbers assigned to the links of FIGS. 3-5 that are 10 or smaller and that are called "link cost"). For example, it is possible for the system topology generation portion 509 to assign a high link cost to a link which is going to be temporally closed. Due to this, it is possible to simply and easily generate the system topology information having a tree structure based on the system topology information having a net (network) structure. Further, it is possible to simply and easily update a structure of a tree of the system topology information having the tree structure.

The trouble notification portion 503 of the trouble analysis apparatus notifies the operator of both the trouble notifications and the presumed-specific trouble-point information (Step S206).

In accordance with the trouble analysis apparatus 50 of the embodiment of the present invention described above, a trouble spot is determined based on the system topology information (concept of spreading directions of error operations) which covers the overall system. Therefore, it is possible to resolve troubles occurring in a very large range. In addition, small amount of load and labor are required to the operator because it is not necessary to conduct closely examining operations and defining operations on relationship between the trouble events and the specific trouble spots.

Further, if the system configuration is updated, the system topology management portion 508 receives the system information, and the system topology information generation portion 509 regenerates the latest system topology information. Therefore, any load and labor are not required to the operator.

It should be noted that when using the conventional trouble analysis apparatus 40, if an inappropriate trouble spot is determined or if no trouble spot is determined, very hard operations and labor are required to the operator. However, when using the trouble analysis apparatus 50, in the worst case, if an inappropriate trouble spot is determined or if no trouble spot is determined, comparatively less operations and labor are required to the operator. This is because the operator can use the topology information not including information regarding the apparatuses and the layers to which the functional elements belong (system topology information and trouble topology information), that is, the topology information not including information regarding the apparatus and the layer to which each functional element belongs (system topology information and trouble topology information).

Figure 9:
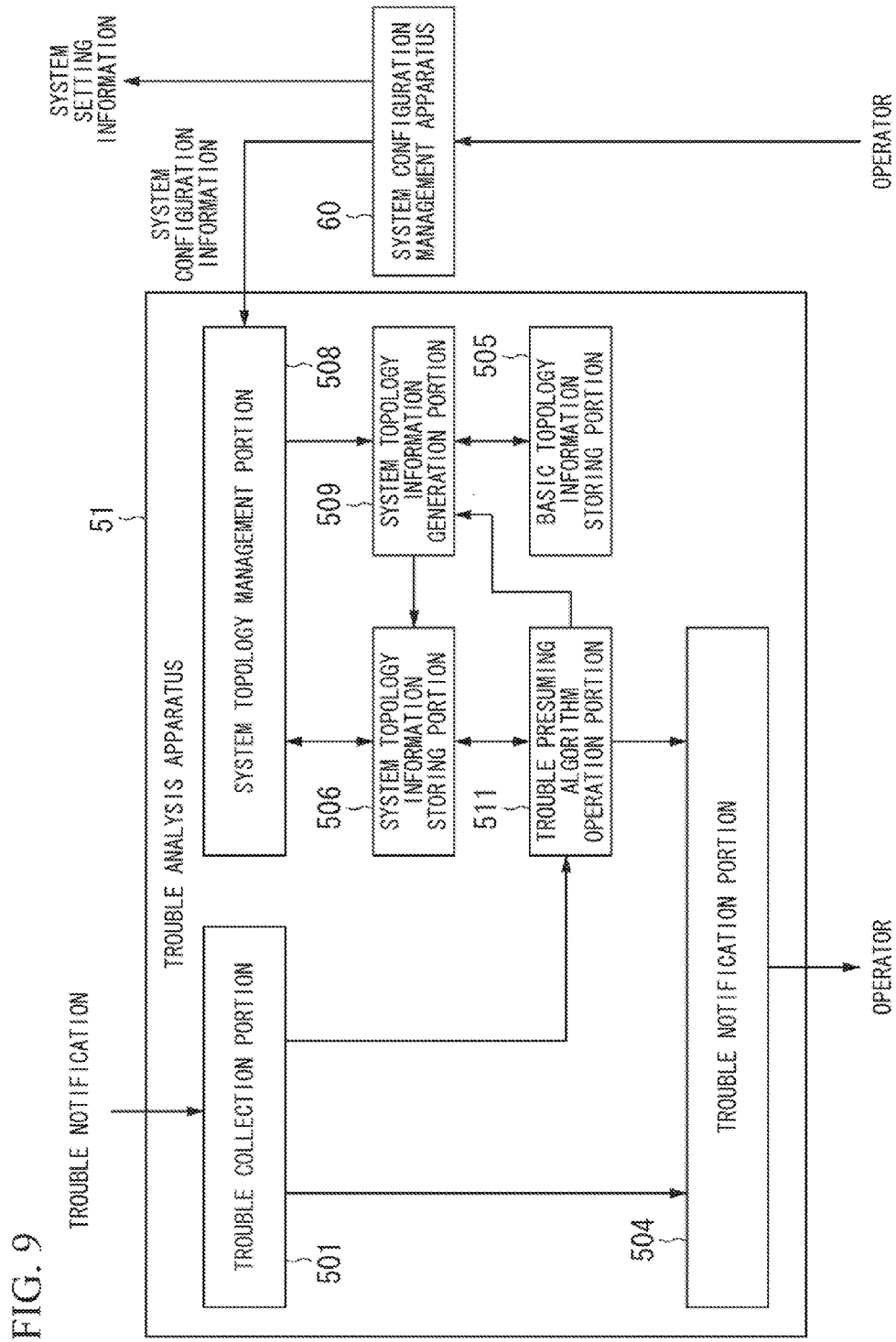
FIG. 9 is a block diagram of the trouble analysis apparatus.

It should be noted that the trouble analysis apparatus 50 is explained above as one embodiment as shown in FIG. 1 that includes the trouble collection portion 501, the trouble notification portion 504, the basic topology information storing portion 505, the system topology information storing portion 506, the trouble topology information storing portion 507, the system topology management portion 508, the system topology generation portion 509, the trouble topology information generation portion 510 and the trouble presuming algorithm operation portion 511. In other embodiment, it is possible to use a trouble analysis apparatus 51 shown in FIG. 9 as a substitute. FIG. 9 is a block diagram of the trouble analysis apparatus 51 of another embodiment of the present invention.

As shown in FIG. 9, the trouble analysis apparatus 51 includes the trouble collection portion 501, the trouble notification portion 504, the basic topology information storing portion 505, the system topology information storing portion 506, the system topology management portion 508, the system topology generation portion 509 and the trouble presuming algorithm operation portion 511 (the same reference numeral is assigned to the same constitution element as FIG. 1). In other words, the trouble analysis apparatus 51 shown in FIG. 9 does not include the trouble topology information storing portion 507 and the trouble topology information generation portion 510 which are included in the trouble analysis apparatus 50 shown in FIG. 1.

Therefore, when the trouble collection portion 501 receives multiple trouble notifications regarding multiple error functional elements, the trouble presuming algorithm operation portion 511 of the trouble analysis apparatus 51 sequentially selects one of the multiple error functional elements. The trouble presuming algorithm operation portion 511 determines whether or not directions from the selected error functional element to other functional elements which are not selected conform to spreading directions included in the trouble topology information. If the trouble presuming algorithm operation portion 511 determines that the spreading direction is conformable, the trouble presuming algorithm operation portion 511 determines that the currently selected trouble functional element is the trouble source functional element. In other words, the trouble presuming algorithm operation portion 511 determines the trouble source functional element based on the system topology information without generating the trouble topology information.

As shown above, the embodiments of the present invention are explained in reference to the drawings, and it should be noted that concrete constitutions are not limited to such embodiments and include, for example, design modifications that do not deviate from the contents of the present invention.

INDUSTRIAL APPLICABILITY

In accordance with the constitutions described in the above embodiments, it is possible to provide a trouble analysis apparatus that can resolve troubles of a large range in a computer system.

DESCRIPTION OF THE REFERENCE SYMBOLS 1 multilayer system
10 server
20 client
30 switch
40 conventional trouble analysis apparatus
50 trouble analysis apparatus
51 trouble analysis apparatus
60 system configuration management apparatus
100 computer hardware
101 network card
102 HDD
103 CPU
104 main memory
109 trouble monitoring portion
110 operating system
111 network driver
112 HDD driver
113 network protocol
114 memory management portion
119 trouble monitoring portion
120 server application
121 application processing portion
129 trouble monitoring portion
200 computer hardware
201 network card
202 HDD
203 CPU
204 main memory
209 trouble monitoring portion
210 operating system
211 network driver
212 HDD driver
213 network protocol
214 memory management portion
219 trouble monitoring portion
220 client application
221 application processing portion
229 trouble monitoring portion
300 switch hardware
301 network interface (NW I/F)
302 network interface (NW I/F)
303 network interface (NW I/F)
304 switch fabric
305 CPU
306 memory
309 trouble monitoring portion
310 operating system
311 switch driver
312 memory management portion
319 trouble monitoring portion
320 switch application
321 routing protocol
329 trouble monitoring portion
401 trouble collection portion
402 search portion
403 trouble analysis table
404 trouble notification portion
501 trouble collection portion
504 trouble notification portion
505 basic topology information storing portion
506 system topology information storing portion
507 trouble topology information storing portion
508 system topology management portion
509 system topology generation portion
510 trouble topology generation portion
511 trouble algorithm operation portion

The invention claimed is:

1. A trouble analysis apparatus of a computer system constituted from functional elements including hardware and software, comprising:
a system topology information storing portion storing system topology information which includes both information of the functional elements and information of links between the functional elements that indicates spreading directions of error operations between the functional elements upon trouble;
an error detection information receiving portion collecting error detection information regarding error functional elements that are the functional elements in which error operations are indicated; and
a trouble source determination portion which, based on the error detection information and the system topology information, determines a trouble source functional element from the functional elements that is presumed as a source of the trouble.

2. A trouble analysis apparatus according to claim 1, wherein
when the error functional element is plural, the trouble source determination portion sequentially selects one of the plurality of error functional elements, and
when spreading directions of error operations from the selected error functional element to other error functional elements conform to the spreading directions included in the system topology information, the trouble source determination portion determines the selected error functional element as the trouble source functional element.

3. A trouble analysis apparatus according to claim 1, further comprising
a trouble topology information generation portion which, in reference to the system topology information, generates trouble topology information constituted from both the multiple error functional elements and links between the multiple error functional elements, wherein
when spreading directions of error operations from the selected error functional element to other error functional elements conform to the spreading directions included in the error topology information, the trouble source determination portion determines the selected error functional element as the trouble source functional element.

4. A trouble analysis apparatus according to claim 1, further comprising:
a basic topology information storing portion which, with regard to each layer included in each apparatus that constitutes the computer system, stores basic topology information constituted from both the functional elements included in the layer and links between the functional elements included in the layer; and
a system topology information generation portion which, in reference to both information that indicates configuration of the computer system and the basic topology information, generates the system topology information.

5. A trouble analysis apparatus according to claim 1, wherein
the system topology information generation portion updates the system topology information by using a tree structure in reference to the plurality of error functional elements.

6. A non-transitory computer readable medium storing a computer program which, when executed by a computer, performs a method of conducting a trouble analysis in a computer system which is constituted from functional elements including both hardware and software, the method comprising:
- generating topology information which includes both information of the functional elements and information of links between the functional elements that indicates spreading directions of error operations between the functional elements upon trouble;
- collecting error detection information regarding error functional elements that are the functional elements in which error operations are indicated; and
- determining a trouble source functional element from the functional elements that is presumed as a source of the trouble based on the error detection information and the system topology information.

7. A trouble analysis method of a computer system which is constituted from functional elements including both hardware and software, comprising steps of:
- generating topology information which includes both information of the functional elements and information of links between the functional elements that indicates spreading directions of error operations between the functional elements upon trouble;
- collecting error detection information regarding error functional elements that are the functional elements in which error operations are indicated; and
- determining a trouble source functional element from the functional elements that is presumed as a source of the trouble based on the error detection information and the system topology information.

* * * * *